United States Patent [19]

Costello et al.

[11] 4,422,660

[45] Dec. 27, 1983

[54] REMOVABLE WHEEL ASSEMBLY FOR WHEELCHAIRS

[75] Inventors: William D. Costello, Ventura; Charles J. Helton, III, Camarillo; Martin B. Frank, Los Angeles, all of Calif.

[73] Assignee: American Hospital Supply Corporation, Evanston, Ill.

[21] Appl. No.: 361,239

[22] Filed: Mar. 24, 1982

[51] Int. Cl.[3] .............................................. B62M 1/14

[52] U.S. Cl. .................... 280/242 WC; 280/289 WC; 280/304; 280/647; 297/DIG. 4; 301/132

[58] Field of Search ............... 280/242 WC, 289 WC, 280/296, 304, 647; 301/119, 125, 132, 135; 297/DIG.4

[56] References Cited

U.S. PATENT DOCUMENTS

| | | | |
|---|---|---|---|
| 2,882,063 | 4/1959 | Strasel | 301/132 |
| 3,889,964 | 6/1975 | Pitts | 280/242 WC |
| 4,360,213 | 11/1982 | Rudwick et al. | 280/242 WC |

*Primary Examiner*—John A. Pekar
*Assistant Examiner*—D. Lynn Fugate
*Attorney, Agent, or Firm*—Roger A. Williams

[57] ABSTRACT

An assembly which can be mounted to a wheelchair to provide easy removal of the drive wheels of a wheelchair comprises a connector block mounted on a wheelchair frame, which connector has a first orifice extending therethrough for receiving an axle of a drive wheel of a wheelchair and a second orifice extending therethrough and at least partially intersecting the first orifice. A drive wheel axle having an annular groove at one end extends into the first orifice of the connector block such that the annular groove aligns with the second orifice. A rod rotatable about its longitudinal axis extends through the second orifice of the connector block with at least a portion of the rod having a generally circular cross section and a slot therealong. The slot aligns with the first orifice of the connector block. A first arm is fastened to and extends radially from the rod and moves with rotation of the rod. A second arm is pivotaly linked to the first arm. A leg is pivotally linked to the second arm and slidably mounted to the frame. The leg cooperates with the rod, first arm and second arm to move between a surface-engaging position and surface-disengaging position upon rotation of the rod such that the rod intersects the annular groove of the axle when the leg is in the surface-disengaging position and the slot on the rod aligns with the first orifice and faces the annular groove of the axle when the leg is in the surface-engaging position.

32 Claims, 10 Drawing Figures

REMOVABLE WHEEL ASSEMBLY FOR WHEELCHAIRS

BACKGROUND OF THE INVENTION

The invention herein relates to an improved wheelchair. Wheelchairs are generally formed in various configurations, but basically each has a tubular metal frame with a seat stretched on the frame. The frame supports main drive wheels axially connected to the frame and secondary wheels axially connected to the frame for providing balance and steering. Generally, the drive wheels are positioned adjacent the back of the wheelchair and the secondary wheels are positioned at the front of the wheelchair.

Some wheelchairs are collapsible so that they can stowed when not in use. It is important to have the collapsible wheelchairs as small as possible when in a collapsed state. In many wheelchairs, the collapsed state is often quite large because the wheels and wheel hubs extend outwardly, adding to the width of the wheelchair. If the wheels remain on the wheelchair in its collapsed state, the wheels themselves add to the difficulty in positioning the wheelchair in a compact space, such as the trunk or rear seat portion of a car.

It would be desirable to have a wheelchair on which the large drive wheels could be removable, simply and readily to facilitate collapsing and storing of the wheelchair. It would be further desirable to have a wheelchair which can have its drive wheels removable by the person sitting in the chair. Such a chair could avoid the need of having an attendant accompany the person confined to the wheelchair as he travels.

It would also be highly desirable to have an assembly which could be adapted to or mounted on state of the art wheelchairs and which would enable such wheelchairs to have their drive wheels removable by the person confined to the wheelchair.

SUMMARY OF THE INVENTION

The invention herein is directed to an improved wheelchair and an assembly which can be mounted on conventional wheelchairs to provide removability to the large drive wheels of the wheelchair. Whether the assembly is incorporated on a wheelchair or mounted to an existing wheelchair, it can provide the ability to the occupant of the wheelchair to be able to remove the large drive wheels. Thereby, the occupant is able to more readily store and transport the wheelchair and drive wheels. The assembly herein also provides improved characteristics to the wheelchair on which it is mounted. If added features described herein are incorporated on the wheelchair, the occupant of the wheelchair can more easily transfer from the wheelchair to an adjacent surface such as a vehicle, chair, bed and the like.

The assembly herein comprises a first rod which is rotatable about its longitudinal axis. The first rod can be mounted to a wheelchair frame such that the first rod extends from the front toward the back of the frame. The first rod is mounted to the wheelchair to permit the rod to be rotated about its longitudinal axis. The first rod can be mounted to the frame of the wheelchair with a suitable bracket having a bearing through which the rod extends. The bracket can be secured to the frame of a wheelchair.

A handle is attached to the first rod and extends radially from the first rod. Preferably, the handle is attached to the first rod at the forward end of the rod. The handle is so fixed to the first rod such that movement of the handle causes rotation of the first rod about its longitudinal axis.

The assembly further comprises a connector block assembly which can be mounted on the frame of a wheelchair. The connector block assembly can comprise two separate sections: the connector block and a clamping member. The connector block has a first orifice extending therethrough for receiving an axle of a drive wheel of the wheelchair. The connector block also has a second orifice extending therethrough, which second orifice at least partially intersects the first orifice. The second orifice is provided in the connector block for receiving an extension of the first rod. The connector block and clamping member can encircle a portion of the tubular frame of the wheelchair to enable clamping of the connector block and clamping member to the frame using suitable clamping elements, such as threaded bolts.

The invention herein includes the use of a uniquely designed axle for the drive wheels. That is, if the assembly is mounted on a conventional wheelchair, the conventional axle is discarded and the axle of the present invention utilized. The axle herein has an annular groove at one end such that when the axle is inserted into the first orifice of the connector block the annular groove aligns with the second orifice.

An extension on the first rod is inserted into and through the second orifice of the connector block. The cross section of the first rod can be generally any configuration, but a portion of the extension of the first rod has a generally circular cross section. Along such a portion of the extension of the first rod having a circular cross section there is a slot. The slotted portion of the extension has a cross section which is generally a truncated circular cross section. When the extension is inserted into the second orifice of the connector block, the slot on the extension aligns with the first orifice. When both the axle and extension of the first rod are inserted into their respective orifices of the connector block, the axle can be either selectively fixed or removable from the connector block. That is, if the extension of the first rod is rotated about its longitudinal axis such that the circular portion of the truncated circular cross section engages the annular groove of the axle, the axle is fixed in the connector block. If the extension of the first rod is rotated about its longitudinal axis such that the slot on the extension faces the annular groove of the axle, the axle can be withdrawn from the connector block.

The assembly herein includes apparatus for lifting the wheelchair to raise the drive wheels off the surface on which they rest to enable their removal from the wheelchair. The lifting portion of the assembly operates cooperatively with the rotation of the first rod which releases the axle of the drive wheel.

The lifting apparatus comprises a first arm which is fastened to and extends radially from the first rod. The first arm is fastened to the first rod such that rotation of the first rod moves the first arm. A second arm is pivotally linked to the first arm. The pivotal linkage is provided along the first arm spaced from the first rod.

A leg is pivotally linked to the second arm at a second pivotal linkage linking the first and second arms. The leg can move between a surface-engaging position and a surface-disengaging position. The leg is mounted to the frame of the wheelchair through a bracket which permits sliding or movement of the leg between its surface-engaging position and surface-disengaging position.

A tensioning spring is operatively connected to the leg. The tensioning spring can be a biasing spring which tends to retain the leg in a surface-disengaging position. Such a biasing spring can have one of its ends connected to the connector block with the remaining end connected to the leg to operate as an extension spring. In an alternative embodiment, the biasing spring can be within the bracket structure which mounts the leg onto the wheelchair frame to operate as a compression spring. In another alternative embodiment, a torsion spring can be affixed to the first arm and connector block and suitably pretensioned. The tensioning spring, leg, first and second arms cooperate with the first rod such that upon rotation of the first rod the leg can be either moved to its surface-engaging position or surface-disengaging position.

The invention herein provides a wheelchair which can have its main drive wheels readily removed. As the main drive wheels can be removed, additional improvements in the construction of a wheelchair are contemplated herein which are not possible for a wheelchair construction having fixed drive wheels. An improvement which is made possible by the ability to remove the drive wheels is a fold down arm on the wheelchair. After the drive wheels are removed from the wheelchair, at least one of the arms of the wheelchair can be folded down to form a transfer surface, commonly referred to as transfer board.

The fold down arm includes a first pivot pin having sections with differing cross sectional configurations. One of the sections has a circular cross section. A second pivot pin is provided and the arm is pivotally connected to the frame of the wheelchair through the two pivot pins. The first pivot pin is spring biased such that the section of the pivot pin not having a circular cross section passes through the arm and prevents the arm from being folded down. That is, the arm is retained in its generally upright, or normal, position. An eccentric clip is axially fastened to the first pivot pin, which clip upon being moved exerts against the biasing spring, causing the section of the first pivot pin having a circular cross section to pass through the fold down arm. The fold down arm can then be pivoted about the first and second pivot pins to fold it downwardly, forming a transfer surface. The fold down arm can include a pivotal arm rest such that when the arm folds down and engages an adjoining surface to which the confined person is to transfer, the arm rest pivots forming a substantially smooth surface between the arm and adjoining surface.

Another feature which is contemplated by the invention herein is a pivotal arm on the wheelchair which can be pivoted upwardly to swing out of the way, thus enabling movement from the wheelchair after the drive wheel has been removed.

BRIEF DESCRIPTION OF THE DRAWINGS

The assembly herein will be better understood with regard to the following detailed description of the preferred embodiment and accompanying drawings wherein.

DETAILED DESCRIPTION

Figure 1:
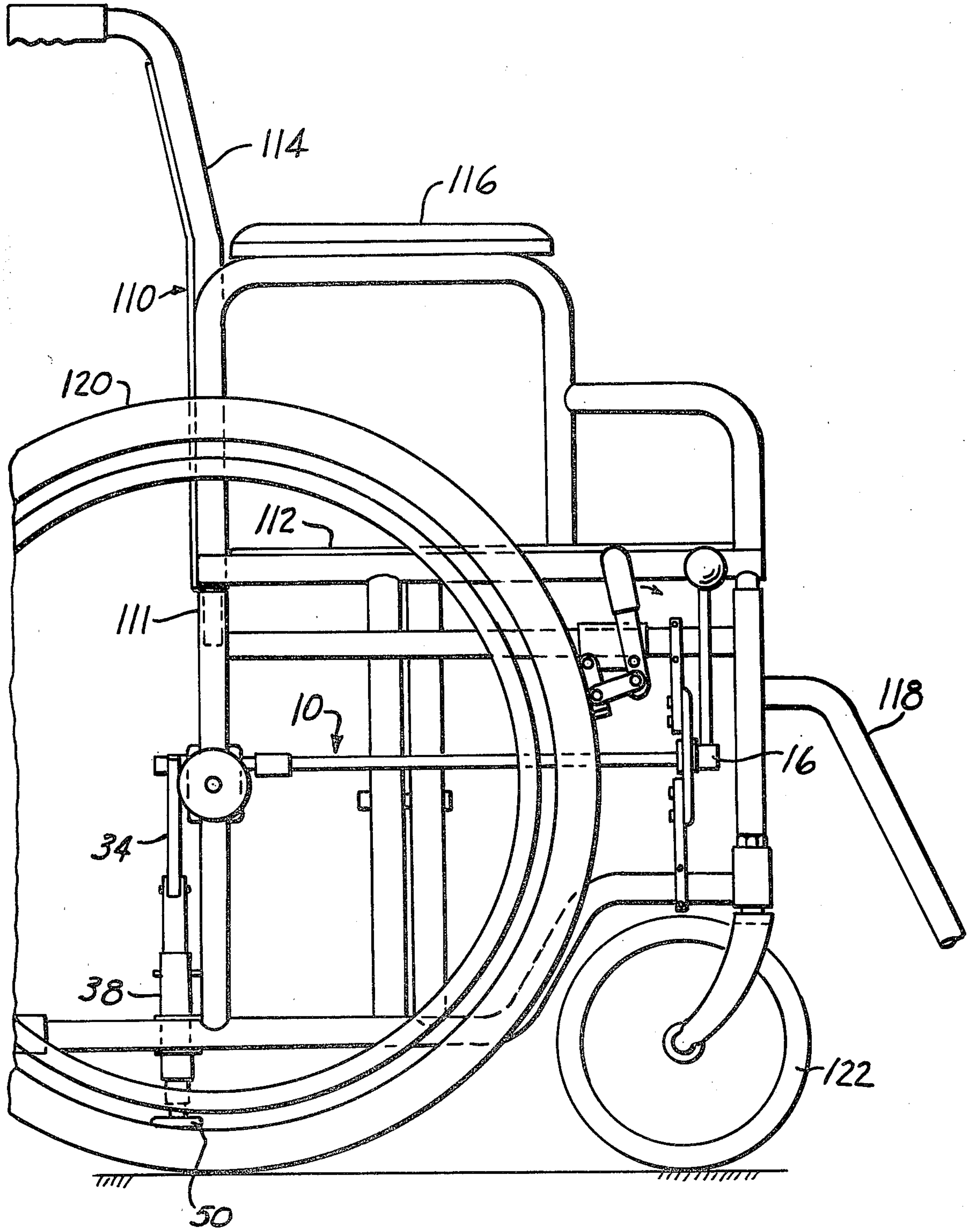
FIG. 1 is a partially fragmented lateral view of a wheelchair showing the assembly of the invention herein mounted to the frame of the wheelchair.

Referring now to FIG. 1 of the drawings, the assembly of the present invention is shown in use on a wheelchair. An advantage of the present assembly is that it can be mounted on existing wheelchairs or can be mounted on wheelchairs at the time of manufacture.

As shown in FIG. 1, a wheelchair 110 comprises a structural frame 111 which for strength is generally a tubular metal frame. Attached to and extending between portions of the frame is a seat 112 and a back 114. Along the sides of the seat are arms 116. A leg rest 118 extends outwardly and downwardly for supporting the legs of the person confined to the wheelchair.

Generally wheelchairs are four-wheeled vehicles. There is usually two large drive wheels 120 located at the back of the wheelchair and two smaller caster wheels 122 at the front of the wheelchair. The drive wheels are attached to the wheelchair frame through an axle fixed to the frame. The caster wheels are attached to the wheelchair through a swivel mounting which permits the caster wheels to turn freely to accomodate the direction of travel of the wheelchair as is dictated by the manipulation of the drive wheels or attendant pushing the wheelchair.

The assembly 10 herein provides for lifting of the drive wheels 120 and simultaneously releasing the drive wheels so that they can be removed from the wheelchair. The assembly herein is mounted in duplicate to a wheelchair in order to enable removal of both of the drive wheels. For ease of discussion herein, only one assembly mounted on one side of the wheelchair can be described, although it is understood that for operation to remove both drive wheels, a second mirror image assembly is mounted to the other side of the wheelchair.

Figure 2:
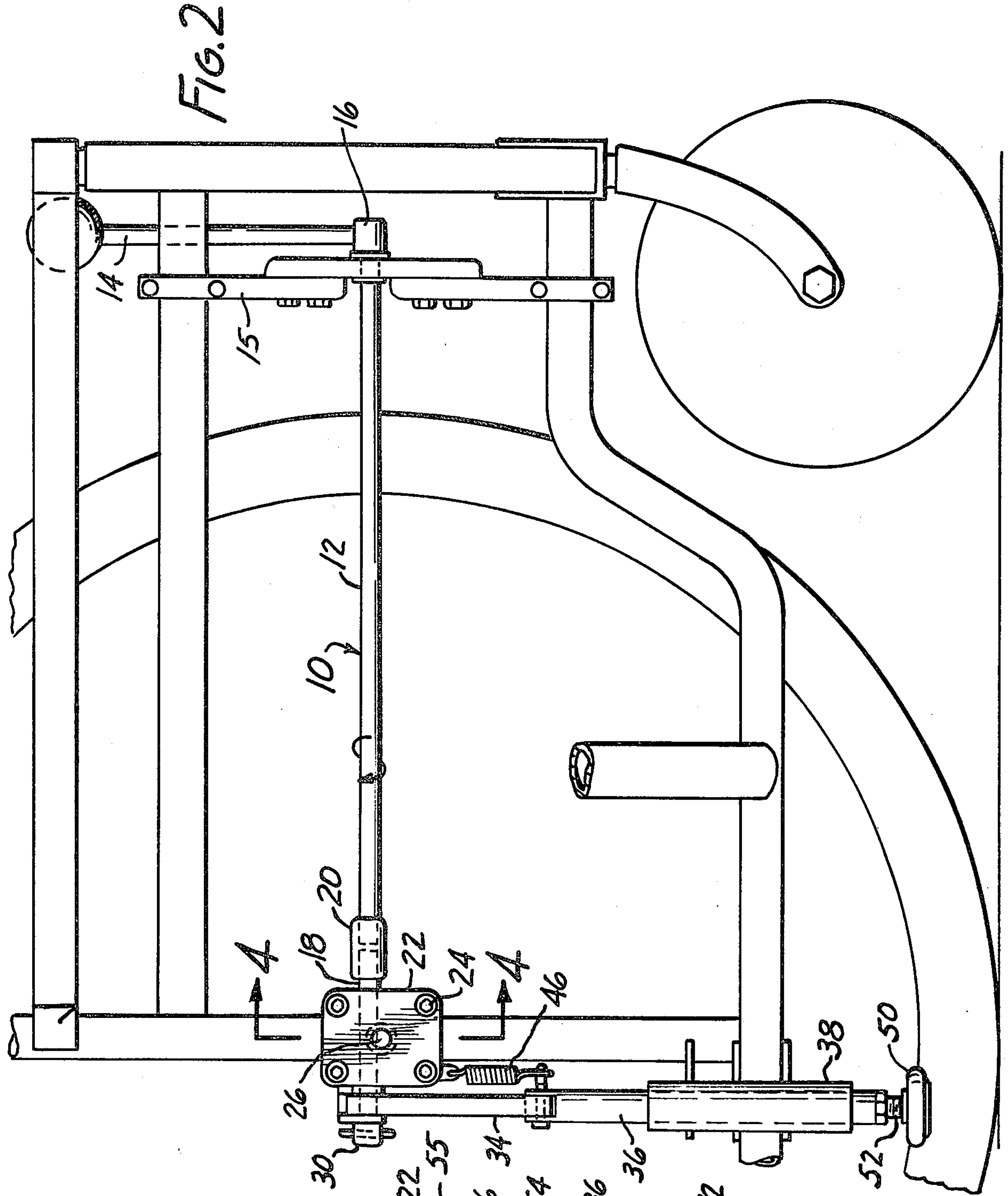
FIG. 2 is a cross-sectional view of a wheelchair illustrating the assembly herein which schematically shows how the assembly can be mounted to a wheelchair.

Referring to FIG. 2 which is a cross-sectional view of a wheelchair looking outwardly toward a drive wheel, the assembly 10 herein is shown mounted to the wheelchair frame. The assembly 10 comprises a first rod 12 mounted to the wheelchair such that the first rod can be rotated about its longitudinal axis. The first rod extends from the front toward the back of the frame of the wheelchair. The first rod can have any desirable cross-sectional configuration along the major portion of its length, such as circular, square, rectangular, pentagonal, hexagonal, octagonal and the like.

Figure 3:
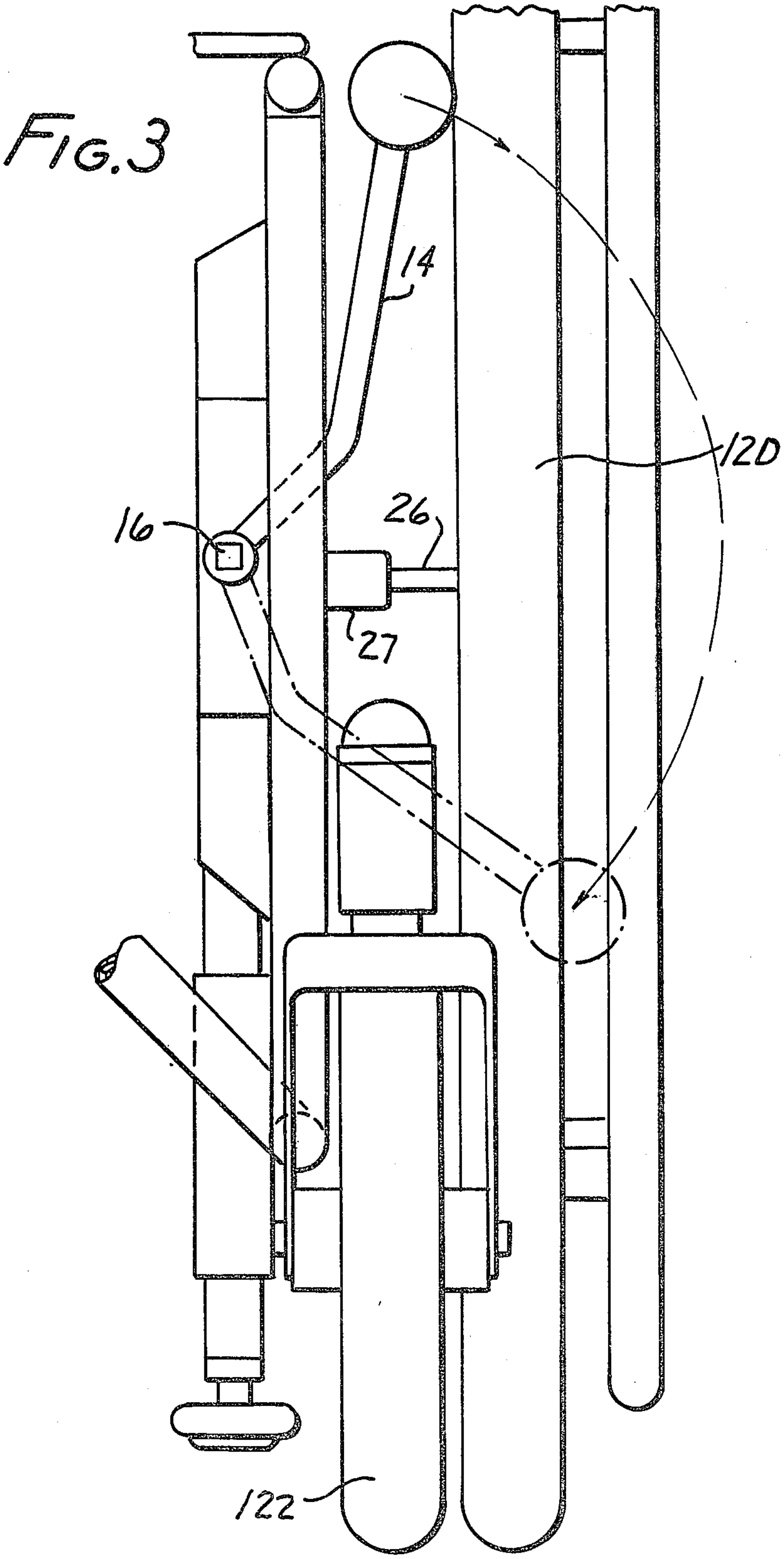
FIG. 3 is an enlarged fragmentary end elevational view of the assembly shown in FIG. 2.

An actuating handle 14 is connected to the first rod adjacent the front of the wheel chair. The handle is attached radially to the first rod. That is, the handle extends generally radially from the longitudinal axis of the first rod. As shown in FIG. 3, the handle can be configured with a bend. The handle is securely attached to the first rod so that movement of the handle through the arc shown in phantom in FIG. 3 will concomitantly rotate the first rod about its longitudinal axis.

A mounting assembly 15 can be used to mount the first rod to the tubular frame of the wheelchair at the front of the wheelchair. The mounting assembly can be any convenient assembly, such as the threaded bolt assembly and brackets shown in FIG. 2. The mounting assembly 15 provides a mechanism by which the assembly 10 herein can be adapted to an existing wheelchair.

A second rod 18 is attached to the first rod 12 through a suitable coupling 20. The first and second rods are attached so that rotation of the first rod causes rotation of the second rod. The longitudinal axis of the second rod 18 aligns with the longitudinal axis of the first rod. Although in the preferred embodiment a first and second rod are present, the invention herein contemplates that one rod could be used herein if an extension of the rod includes a configuration as will hereinafter be described in regard to the second rod 18.

The second rod 18 is, preferably, generally circular in cross section. However, a slot is cut into the second rod such that a portion of the second rod has a truncated circular cross section. The truncated circular cross section 19 is shown clearly in FIG. 4. The benefits of the circular and truncated circular cross sections caused by a slot being formed along the second rod will be more fully described hereinafter.

A connector block 22 is mounted to the frame of the wheelchair at a location where the drive wheel axle mounts to the wheelchair frame. The connector block has a first orifice which extends therethrough for receiving an axle of a drive wheel of the wheelchair. The connector block also includes a second orifice therethrough, which second orifice at least partially intersects the first orifice. The second orifice is provided for receiving the second rod. A clamping member 23 which, when combined with the connector block, can encircle a portion of the tubular frame of the wheelchair to secure the connector block to the wheelchair. The connector block is attached to the frame of the wheelchair such that the clamping member 23 would be on the outside of the wheelchair frame and the connector block would be on the inside of the frame. Clamping elements 24, such as threaded bolts, can be used to interlock the connector block and clamping member to the tubular frame 29. The connector block is positioned along the tubular frame of a wheelchair such that the first orifice aligns with the drive wheel axle orifice of the wheelchair frame. Thus, an axle inserted through the first orifice of the connector block will also extend through the frame of the wheelchair.

The assembly herein contemplates the use of a specially designed axle for the main drive wheels of the wheelchair on which the assembly is mounted. It will be appreciated that the original axle of a wheelchair, which is commonly threadedly attached to the wheelchair frame through an internally threaded sleeve, is replaced with axle 26. Such an axle includes split rings and corresponding washer assemblies 21 and 25.

The split rings engage spaced apart axle grooves to define a predetermined axle length within which the wheel hub of a main drive wheel will fit securely. The washers operate as spacers to allow for differing vehicle wheel hub widths. The clamping member 23 includes a large opening which is necessary for assembly of the drive wheel to the frame so that an internally threaded sleeve 27 can pass into the opening allowing the ring to abut against an outer boss of the threaded sleeve.

The axle 26 includes an annular groove 28 adjacent its end that is inserted into the connector block. The groove extends around the circumference of the axle and preferably corresponds in shape to a semicircle. That is, the groove is rounded and about semicircular in shape.

In a preferred embodiment of the present invention, the longitudinal axis of the first orifice extends about perpendicular to the longitudinal axis of the second orifice. Thus, when the axle is inserted into the first orifice and the second rod is inserted into the second orifice, the longitudinal axes of the axle and second rod are perpendicular.

Figure 4:
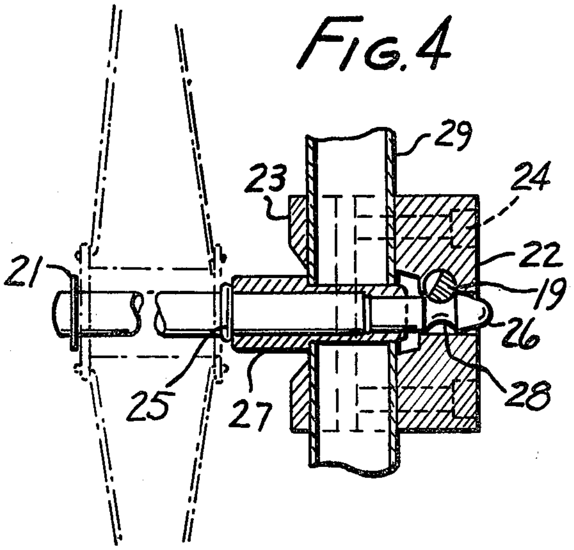
FIG. 4 is an enlarged cross-sectional view of the connector block taken along line 4—4 of FIG. 2.

The annular groove on the axle is positioned such that when the axle is inserted into the first orifice of the connector block, the annular groove 28 aligns with the second orifice extending through the connector block. As shown in FIG. 4, the second rod intersects the axle at the annular groove. The slot is cut into the second rod such that when the second rod is inserted into the connector block, the slot aligns with the first orifice. The axle can thereby be locked or released from the connector block by positioning the second rod through rotation about its longitudinal axis. FIG. 4 shows the axle fixed within the connector block. When the second rod 18 is rotated to place the slot on the second rod adjacent or facing the axle, then the axle is released from the connector block. In such a released configuration, the axle can be withdrawn from the connector block.

Aligning the slot in the second rod with the annular groove in the axle permits the axle to be withdrawn from the connector block. When the second rod is rotated such that a portion of the second rod intersects the annular groove on the axle, the axle cannot be withdrawn from the connector block.

Figure 5:
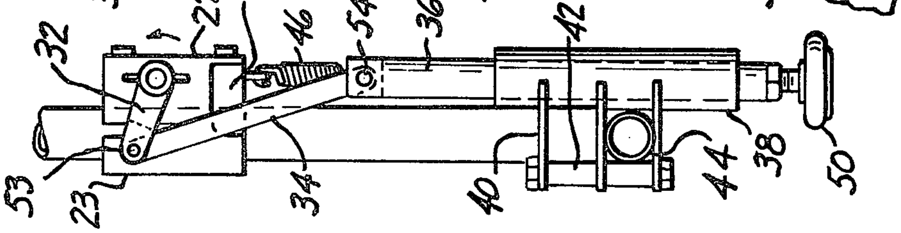
FIG. 5 is another fragmentary end elevational view of the assembly shown in FIG. 2.

An extension 30 of the second rod 18 extends beyond the connector block after having passed through the connector block through the second orifice. Attached to the extension 30 is a first arm 32. Referring to FIG. 5, the first arm 32 extends radially from the extension of the second rod. The first arm is attached to the extension such that rotation of the extension causes movement of the first arm. Although shown in the drawings as attached to the extension of the second rod extending beyond the connector block, the first arm can be attached to the second rod before the second rod enters the connector block.

A second arm is pivotally linked through a pivot pin 53 to the first arm. Through such a pivotal linkage, the second arm is free to move concomitantly with the first arm.

The second arm is also pivotally linked through a pivot pin 54 to a leg 36. The leg 36 can be a bar or rod having axial length which is pivotally linked at one of its ends to the second arm. The leg 36 extends through a sleeve 38 which maintains the leg in a generally upright orientation. The inner diameter of the sleeve 38 is slightly larger than the outer diameter of the leg 36. The leg 36 is capable of sliding up and down through the sleeve. The sleeve maintains the leg in an uprightly extending orientation as the sleeve can be fastened to the frame of the wheelchair. As shown in FIG. 5, the sleeve is attached to a support bracket 40 which can be secured to the frame 44 of the wheelchair, such as by using a threaded bolt assembly 42.

The leg 36 of the assembly extends through and beyond the sleeve 38. Attached to the lower end of the leg can be a foot 50. The foot 50 can be attached to the leg through a threaded rod assembly 52. The threaded rod assembly provides the capability of adjusting the position of the foot in regard to the end of the leg. The foot can have a relatively larger diameter than the leg 36. Such a larger diameter permits the foot to engage the surface upon which the wheelchair rests and thereby aids in establishing a solid support when lifting the drive wheel off the surface.

Referring to FIGS. 2 and 5, an extension spring 46 is shown which interconnects the connector block 22 and leg 36. The spring is provided to apply tension to the leg for retaining the leg in a surface-disengaging position. Such a tensioning device as the spring assists in raising the leg 36.

Figure 6:
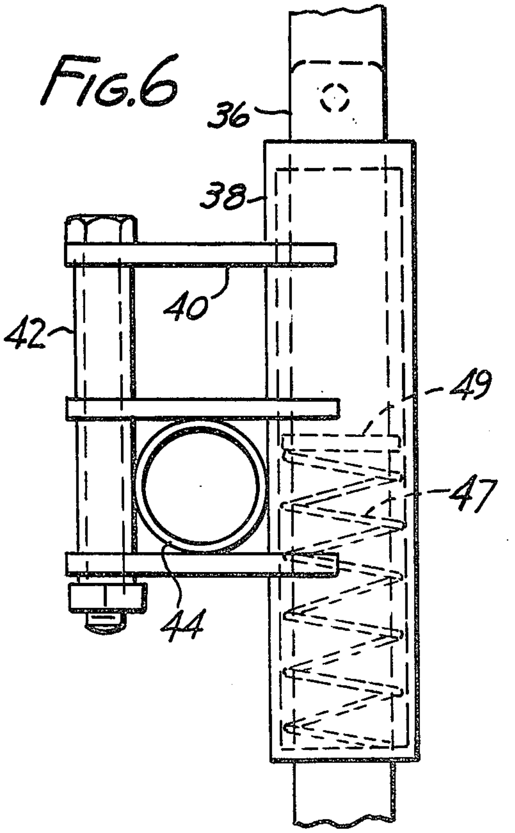
FIG. 6 is an enlarged fragmentary end elevational view of another embodiment of a portion of the assembly.

An alternate embodiment of the tensioning device can be a compression spring 47 shown in FIG. 6. In the alternate embodiment, a spring 47 is provided within the sleeve 38. The leg 36 is provided with an outwardly extending projection 49 which interconnects with the spring 47 and prevents the spring from moving past such projection. As the leg 36 is moved downwardly, it compresses the spring 47, thereby applying a tension in the spring which exerts a force upwardly tending to raise the leg 36.

In still another embodiment, a torsion spring could be fastened to the connector block and second rod. The torsion spring can be pretensioned to apply a tension which exerts a force, tending to maintain the leg in a surface-disengaging position.

The spring, leg, first and second arms and first and second rods cooperatively operate to move the leg between a surface-engaging position and a surface-disengaging position. In the normal functioning of the wheelchair, the leg is in a surface-disengaging position. That is, the leg is in a position near its uppermost path of travel such that the foot is above the surface on which the drive wheels rest. When the leg is in such a surface-disengaging position, the second rod 18 is in a position as shown in FIG. 4 wherein the second rod intersects the annular groove 28 of the axle of the drive wheel. The drive wheel is thereby locked at its axle to the wheelchair frame. Preferably, the actuating handle 14 is in an upwardly extending position as is shown in FIG. 2.

To raise the drive wheel off the ground and move the leg into its surface-engaging position while simultaneously releasing the axle of the drive wheel, the actuating handle 14 is rotated downwardly as is shown in the dashed and phantom lines of FIG. 3. The movement of the actuating handle downwardly causes the first rod 12 to rotate about its longitudinal axis. Simultaneously, the second rod rotates about its longitudinal axis. As the second rod rotates, it moves the slot into a position adjacent the axle such that the second rod no longer interconnects with the annular groove of the axle.

The rotation of the second rod also moves the first arm 32 in a downwardly direction. The second arm and leg which are pivotally linked to the first arm move with the movement of the first arm and thereby also move in a downwardly direction. The distance of travel of the leg 36 is calibrated to the rotation of the second rod. That is, the distance of travel and rotation are calibrated such that when the slot of the second rod is aligned for releasing the axle from the connector block, the leg is in a surface-engaging position; i.e., lowermost path of travel, such that the drive wheel is lifted from the surface on which it has rested. The drive wheel is lifted a sufficient distance to enable its removal from the wheelchair. That is, the path of travel of the leg is greater than the distance from the foot to the surface upon which the wheelchair rests. Such distance can be changed by screwing the foot inwardly or outwardly along the threaded rod 52. Thus, when the leg has completed its path of travel, the drive wheel will be lifted off the surface. When the drive wheel is lifted from the surface, it can be readily removed from the frame by withdrawing the axle 26 from the first orifice of the connector block.

The leg can be locked in the surface-engaging position, that is, with the drive wheels raised off of the surface. The locking mechanism comprises a protruding head on the pivot pin 53. The head protrudes and projects inwardly toward the connector block 22. A recess 55 is provided on the connector block 22. As the first arm 32 rotates about the extension of the second rod, it moves through an arc and is received in the recess 55. The recess 55 extends a sufficient distance across the connector block such that the first arm can travel in an arc at least 5° past a vertical center line extending from the center of the second rod. Additional travel of the first arm is prevented past such a 5° arc as the projecting head of the pivot pin 53 encounters the connector block, i.e., side wall of the recess within the connector block. The leg is thereby locked in the surface-engaging position. The leg can be released by moving the actuating handle 14. While the leg is in the surface-engaging position, the wheelchair will remain stable in the raised position with the axle released permitting either its removal or insertion.

The drive wheels can be reattached by inserting the axle into the first orifice of the connector block and thereafter pulling upwardly on the actuating handle 14. Such movement of the actuating handle rotates the second rod, thereby interlocking the second rod with the annular groove of the axle while simultaneously lifting the leg to the surface-disengaging position. In such position, the drive wheel again rests upon the surface.

As discussed earlier, the first and second rods can be combined such that they constitute one continuous rod. However, it is preferable to have the first and second rods separate. The use of two rods is preferred as it provides adaptability of the assembly. For example, some patients in wheelchairs do not have the use of their upper torso or arms. Thus, the actuating handle located at the front of the wheelchair may not be needed. An attendant would be able to use the handle to raise and release the drive wheels. However, the assembly may be less expensive by omitting the handle and first rod and merely providing the assembly as the second rod, connector block, first and second arms, leg and sleeve. In such a modified assembly, the extension of the second rod beyond the connector block can be provided with a socket or handle engaging end which can be engaged by either a socket or accessory handle which when connected to the extension can be used to rotate the second rod to release the axle and move the leg into a surface-engaging position. The extension can be accessed from the rear of the wheelchair, thus enabling the attendant to readily raise the drive wheels off the surface for their removal. Such a modified assembly can be useful where it is desirable to prevent the occupant of a wheelchair from releasing the drive wheels.

Figure 8:
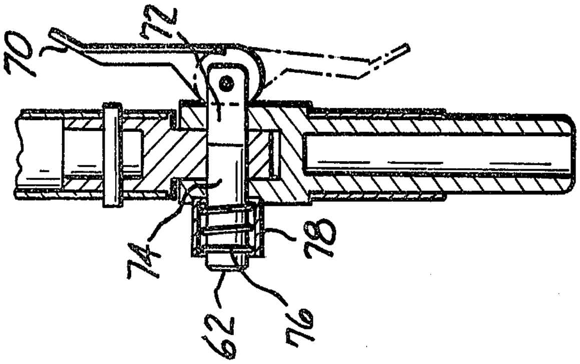
FIG. 8 is an enlarged fragmentary cross-sectional view of the clip shown in FIG. 7.
Figure 9:
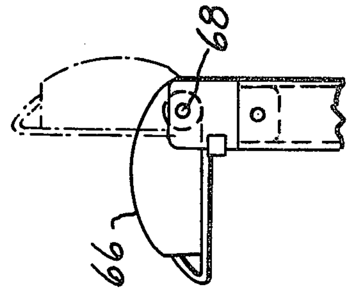
FIG. 9 is a fragmentary end elevational view of the assembly of FIG. 7.
Figure 7:
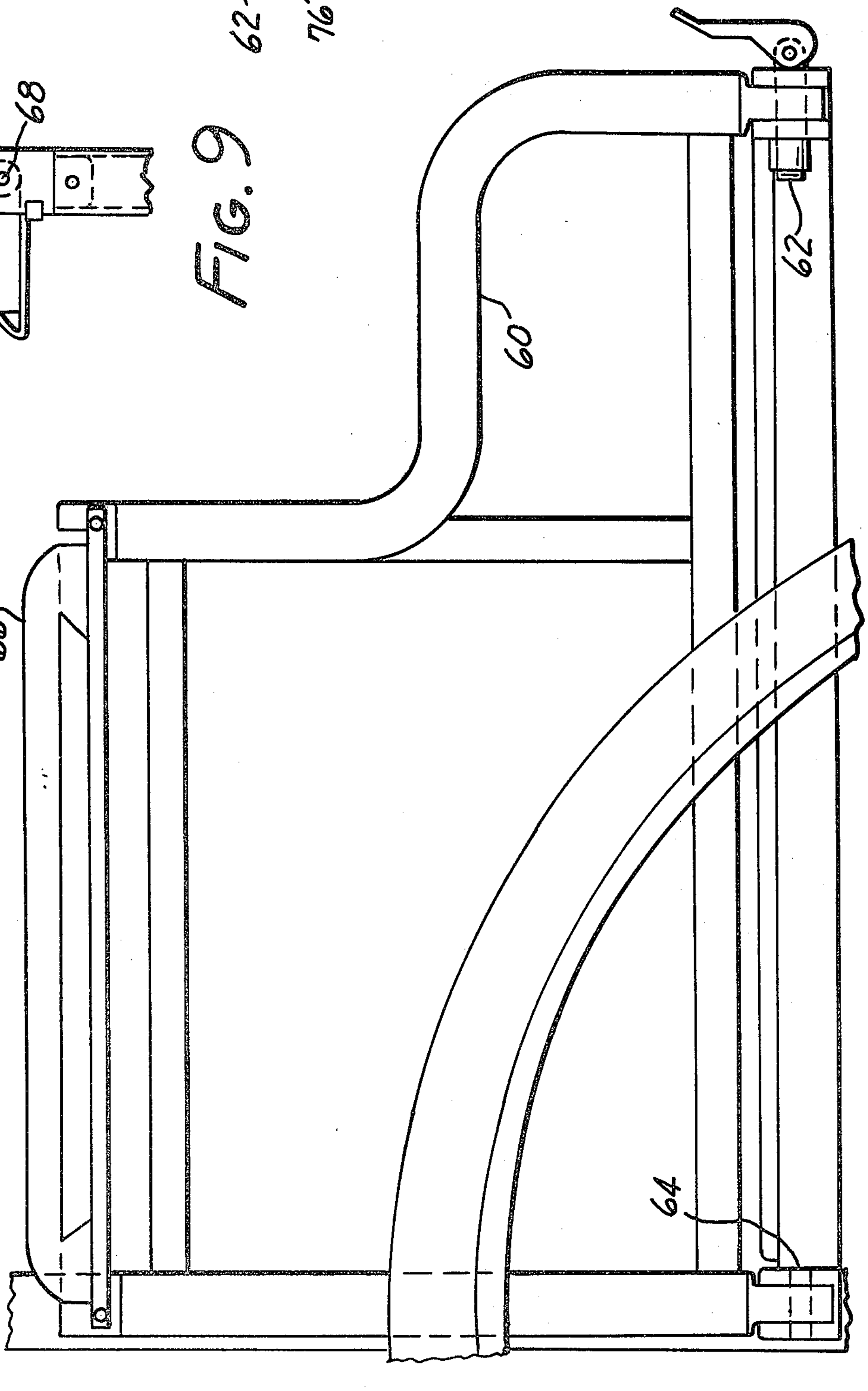
FIG. 7 is a side elevational view of a fold down arm assembly.

The ability to remove the drive wheels from a wheelchair makes other modifications of the general design of the wheelchair possible. The invention herein contemplates the combination of such additional modifications with the releasable drive wheel assembly. With reference to FIGS. 7–9 of the drawings, one available modification is shown. In these figures, a fold down arm assembly 60 is illustrated. The fold down arm is generally configured like the arm of any wheelchair with the exception that it is pivotally attached to the wheelchair frame at about the level of the seat. The arm is pivotally connected to the chair through a first pivot pin 62 and a second pivot pin 64. for convenience herein and for a preferred embodiment which is operable by the person confined to the wheelchair, the first pivot is the actuating pivot pin which selectively provides either the fold down arm assembly to be in a fixed upright position or a fold down position. As can be readily understood, the first pivot pin 62 can be located either at the front or back of the wheelchair.

The fold down arm assembly is provided with circular orifices through which the first and second pivot pins extend to attach the arm assembly to the frame of the wheelchair. The second pivot pin has a general circular cross section which permits the arm to freely rotate about the second pivot pin.

The first pivot pin has at least two sections with differing cross-sectional configurations. A first section 74 of the first pivot pin has a generally circular cross section. A second portion 72 of the first pivot pin has a different cross-sectional configuration, such as a square cross-sectional configuration. The orifice through which the first pivot pin extends has a cross-sectional configuration which corresponds to that of the second portion of the first pivot pin. Preferably, when the fold down arm assembly is in its fixed upright position, at least a portion of the second portion of the first pivot pin extends through the orifice of the fold down arm assembly, thus preventing the fold down arm assembly from rotating about the pivot pins.

A finger operated release lever 70 with an eccentric cam is pivotally attached to the first pivot pin. When the release lever is rotated as shown in phantom in FIG. 8, it withdraws the second portion of the first pivot pin from the cavity in the fold down arm assembly and positions the first pivot pin in the cavity such that the first portion extends through the orifice of the fold down arm assembly. The fold down arm assembly is then free to pivot about the first and second pivot pins. The first pivot pin is spring biased with a spring 76 which exerts tension against the first pivot pin to return the first pivot pin to the position wherein the second portion of the pivot pin extends through the orifice of the fold down arm assembly.

The fold down arm assembly 60 is provided with a pivotal arm rest 66. The pivotal arm rest is pivotally linked to the fold down arm assembly through arm rest pivot pin 68. As shown in FIG. 9, the pivotal arm rest can pivot about the arm rest pivot such that when the fold down arm assembly is folded down to bridge a space between the wheelchair and adjoining surface, the arm rest encounters such an adjoining surface and pivots about the pivot pins to provide a relatively smooth and unobstructed surface so that transfer from the wheelchair to the adjoining surface can be accomplished with relative ease.

When the fold down arm assembly is folded down to bridge a space between the wheelchair and adjacent surface, the person confined to the wheelchair can make a lateral transfer using the fold down arm assembly 60 as a transfer surface. The fold down arm assembly can be a solid surface rather than tubular, thus avoiding the need to carry a separate transfer board. The fold down arm transfer surface can be coated with a coating to facilitate sliding. For example, the surface can be coated with a slippery plastic material such as tetrafluoroethylene fluorocarbon polymers. In many instances, such a lateral transfer is desirable when a forward transfer is impossible or difficult to accomplish. The removability of the side wheel makes such a lateral transfer possible.

Figure 10:
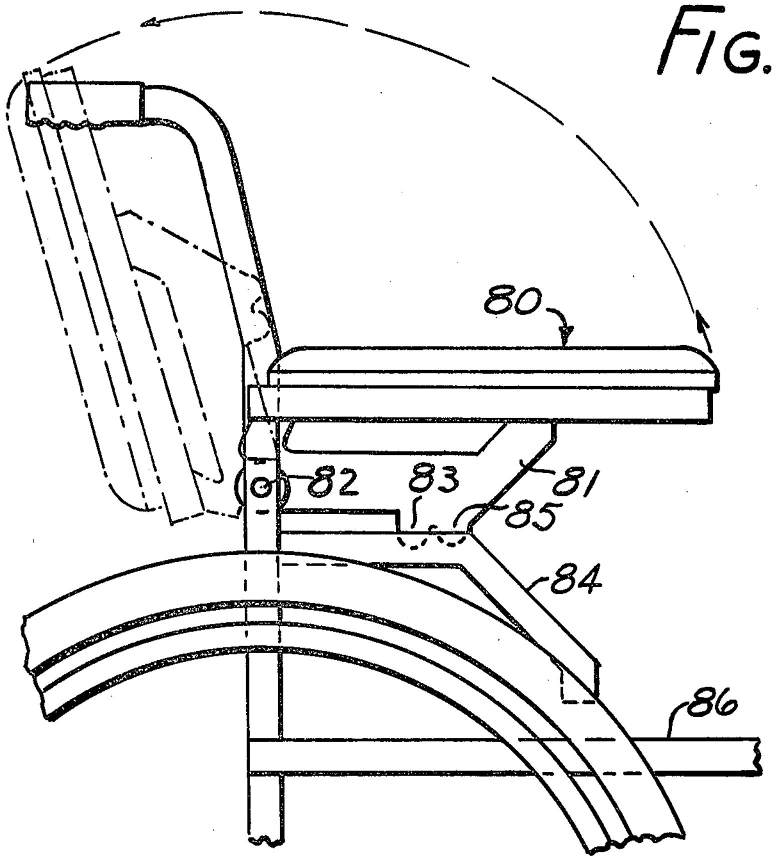
FIG. 10 is a fragmentary side elevational view of a flip up arm assembly mounted to the frame of the wheelchair.

Another modification which is made possible by the removable main wheel concept herein is a modification which also enables lateral transfer from a wheel chair. Such a modification is disclosed in FIG. 10. In FIG. 10 a pivotal arm assembly 80 is shown. FIG. 10 shows the pivotal arm assembly mounted on a wheelchair and as shown in phantom in FIG. 10, swung upwardly out of the way for permitting lateral transfer from the wheelchair.

The pivotal arm assembly 80 comprises an arm assembly which is pivotally linked to the wheel chair frame through a pivot pin 82. The arm is free to swing upwardly around the pivot pin. The pivotal arm assembly has a base assembly 81 which interlocks with a tubular frame assembly 84. The tubular frame assembly 84 has a maximum height which is approximately that of the seat 86 of the wheelchair. The tubular frame assembly 84 has provided orifices for receiving the projections 85 on the base 83. When the projections are inserted into the orifices, the pivotal arm assembly interlocks with the tubular frame, thus preventing lateral movement of the arm assembly and providing strength.

When a lateral transfer is to be made from the modification as shown in FIG. 10, the drive wheel is released and removed and the pivotal arm assembly swung upwardly around pivot pin 82. The pivotal arm assembly is swung out of the way of the occupant of the wheelchair to enable the occupant to slide laterally from the wheelchair to an adjacent surface.

Both the assemblies shown in FIGS. 7–9 and FIG. 10 can be made so that they are adaptable to existing wheelchairs. That is, the fold down arm assembly 60 and the pivotal arm assembly 80 can be so constructed that they mount onto existing wheelchair frames. As the wheel release assembly disclosed herein can also be mounted on existing wheelchair frames, the modifications shown in FIGS. 7–9 and FIG. 10, when combined with the wheel release assembly, can be used to convert existing wheelchairs to wheelchairs which provide the above-discussed advantages to their occupants.

The invention herein also provides an additional benefit other than facilitating drive wheel removal. With both wheels removed, the wheelchair may be reclined at an angle reward by simultaneously operating both actuator levels to their full "up" position. This lowers the legs to their normal surface-disengaged position. However, the absence of the large wheels allows the rear of the chair to be lowered. This provides an alternative seating position for the patient which may tend to be restful.

While the invention has been described with respect to some preferred embodiments, it will be apparent to skilled artisans that other modifications and improvements may be made without departing from the scope and spirit of the invention. Therefore, it will be understood that the invention is not to be limited by the specific, illustrative embodiments, but only by the scope of the appended claims.

We claim:

1. An assembly capable of mounting to a wheelchair in duplicate to provide removal of the drive wheels of the wheelchair, the assembly comprising:

(a) a connector block mounted on a wheelchair frame, the connector block having a first orifice extending therethrough for receiving an axle of a drive wheel of the wheelchair and a second orifice extending therethrough and at least partially intersecting the first orifice;

(b) an axle for a drive wheel having an annular groove at one end and extending into the first orifice of the connector block such that the annular groove aligns with the second orifice;

(c) a rod rotatable about its longitudinal axis and extending through the second orifice of the connector block with at least a portion of the rod having a generally circular cross section and a slot therealong, which slot aligns with the first orifice of the connector block;

(d) a first arm fastened to and extending radially from the rod and which moves with rotation of the rod;

(e) a second arm pivotally linked to the first arm;

(f) a leg pivotally linked to the second arm and slidably mounted to the frame which cooperates with the rod, first arm and second arm to move between a surface-engaging position and surface-disengaging position upon rotation of the rod, such that the rod intersects the annular groove of the axle when the leg is in the surface-disengaging position and the slot on the rod aligns with the first orifice and faces the annular groove of the axle when the leg is in the surface-engaging position.

2. An assembly as recited in claim 1 further comprising a handle attached to the rod.

3. An assembly as recited in claim 2 wherein the rod includes a forwardly extending portion which extends toward the front of the wheelchair and the handle is attached to the forwardly extending portion of the rod adjacent the front of the wheelchair and further comprising mounting means for mounting such forwardly extending portion of the rod to the wheelchair frame.

4. An assembly as recited in claim 3 wherein the mounting means comprises an adjustable bracket assembly which can be releasably attached to the wheelchair frame and which permits rotation of the rod extending through the bracket assembly.

5. An assembly as recited in claim 1 wherein the rod further comprises a handle engaging end extending outwardly from the connector block.

6. An assembly as recited in claim 1 wherein the leg is slidably mounted to the wheelchair frame by a tubular sleeve extending around the leg and a bracket attached to the sleeve, which bracket is releasably attached to the wheelchair frame.

7. An assembly as recited in claim 1 further comprising tensioning means operatively connected to the leg for cooperating with the rod, first arm, second arm and leg to retain the leg in the surface-disengaging position.

8. An assembly as recited in claim 7 wherein the tensioning means comprises an extension spring having one end attached to the connector block and its remaining end attached to the leg.

9. An assembly as recited in claim 7 wherein the tensioning means comprises a tubular sleeve extending around the leg and a compression spring within the tubular sleeve and extending around the leg.

10. An assembly as recited in claim 7 wherein the tensioning means comprises a torsional spring affixed to the connector block and rod.

11. An assembly as recited in claim 1 wherein the second orifice extends through the connector block at about a right angle to the first orifice.

12. An assembly capable of mounting to a wheelchair in duplicate to provide removal of the drive wheels of the wheelchair, the assembly comprising:

(a) a connector block mounted on a wheelchair frame, the connector block having a first orifice extending therethrough for receiving an axle of a drive wheel of the wheelchair and a second orifice extending therethrough and at least partially intersecting the first orifice;

(b) an axle for a drive wheel having an annular groove at one end and extending into the first orifice of the connector block such that the annular groove aligns with the second orifice;

(c) a first rod rotatable about its longitudinal axis and extending through the second orifice of the connector block with at least a portion of the first rod having a generally circular cross section and a slot therealong, which slots aligns with the first orifice of the connector block;

(d) a second rod axially aligned with and releasably connected to the first rod, which second rod extends toward the front of the wheelchair;

(e) mounting means for attaching the second rod to the wheelchair frame;

(f) a handle attached to and extending radially from the second rod;

(g) a first arm fastened to and extending radially from the first rod and which moves with rotation of the first rod;

(h) a second arm pivotally linked to the first arm;

(i) a leg pivotally linked to the second arm and slidably mounted to the frame which cooperates with the first rod, second rod, first arm and second arm to move between a surface-engaging position and surface-disengaging position upon rotation of the first rod, such that the first rod intersects the annular groove of the axle when the leg is in the surface-disengaging position and the slot on the first rod aligns with the first orifice and faces the annular groove of the axle when the leg is in the surface-engaging position.

13. An assembly as recited in claim 12 further comprising tensioning means operatively connected to the leg for cooperating with the first rod, second rod, first arm, second arm and leg to retain the leg in a surface-disengaging position.

14. An assembly as recited in claim 13 wherein the tensioning means comprises an extension spring having one end attached to the connector block and its remaining end attached to the leg.

15. An assembly as recited in claim 13 wherein the tensioning means comprises a tubular sleeve extending around the leg and a compression spring within the tubular sleeve and extending around the leg.

16. An assembly as recited in claim 13 wherein the tensioning means comprises a torsional spring affixed to the connector block and rod.

17. An assembly as recited in claim 12 wherein the second orifice extends through the connector block at about a right angle to the first orifice.

18. An assembly capable of mounting to a wheelchair in duplicate to provide removal of the drive wheels of the wheelchair, the assembly comprising:

(a) a connector block mounted on a wheelchair frame, the connector block having a first orifice extending therethrough for receiving an axle of a drive wheel of the wheelchair and a second orifice extending therethrough and at least partially intersecting the first orifice;
(b) an axle for a drive wheel having an annular groove at one end and extending into the first orifice of the connector block such that the annular groove aligns with the second orifice;
(c) a first rod rotatable about its longitudinal axis and extending through the second orifice of the connector block with at least a portion of the first rod having a generally circular cross section and a slot therealong, which slot aligns with the first orifice of the connector block;
(d) a second rod axially aligned with and releasably connected to the first rod, which second rod extends toward the front of the wheelchair;
(e) mounting means for attaching the second rod to the wheelchair frame;
(f) a handle attached to and extending radially from the second rod;
(g) a first arm fastened to and extending radially from the first rod and which moves with rotation of the first rod;
(h) a second arm pivotally linked to the first arm;
(i) a leg pivotally linked to the second arm;
(j) mounting means for slidably mounting the leg to the frame; and
(k) tensioning means operatively connected to the leg for cooperating with the first rod, second rod, first arm, second arm and leg to move the leg between a surface-engaging position and a surface-disengaging position upon rotation of the first rod, such that the first rod intersects the annular groove of the axle when the leg is in the surface-disengaging position and the slot on the first rod aligns with the first orifice and faces the annular groove of the axle when the leg is in the surface-engaging position.

19. An assembly as recited in claim 18 wherein the tensioning means comprises an extension spring having one end attached to the connector block and its remaining end attached to the leg.

20. An assembly as recited in claim 18 wherein the tensioning means comprises a tubular sleeve extending around the leg and a compression spring within the tubular sleeve and extending around the leg.

21. An assembly as recited in claim 18 wherein the tensioning means comprises a torsional spring affixed to the connector block and rod.

22. A wheelchair assembly comprising a back, seat, two arms, two drive wheels, and two caster wheels, an improvement which can be mounted to the wheelchair frame for enabling removal of the drive wheels, the improvement comprising:

(a) a connector block mounted on a wheelchair frame, the connector block having a first orifice extending therethrough for receiving an axle of a drive wheel of the wheelchair and a second orifice extending therethrough and at least partially intersecting the first orifice;
(b) an axle for a drive wheel having an annular groove at one end and extending into the first orifice of the connector block such that the annular groove aligns with the second orifice;
(c) a rod rotatable about its longitudinal axis and extending through the second orifice of the connector block with at least a portion of the rod having a generally circular cross section and a slot therealong, which slot aligns with the first orifice of the connector block;
(d) a first arm fastened to and extending radially from the rod and which moves with rotation of the rod;
(e) a second arm pivotally linked to the first arm;
(f) a leg pivotally liked to the second arm and slidably mounted to the frame which cooperates with the rod, first arm and second arm to move between a surface-engaging position and surface-disengaging position upon rotation of the rod, such that the rod intersects the annular groove of the axle when the leg is in the surface-disengaging position and the slot on the rod aligns with the first orifice and faces the annular groove of the axle when the leg is in the surface-engaging position.

23. An assembly as recited in claim 22 further comprising tensioning means operatively connected to the leg for cooperating with the rod, first arm and second arm and leg to retain the leg in a surface-disengaging position.

24. An assembly as recited in claim 23 wherein the tensioning means comprises an extension spring having one end attached to the connector block and its remaining end attached to the leg.

25. An assembly as recited in claim 23 wherein the tensioning means comprises a tubular sleeve extending around the leg and a compression spring within the tubular sleeve and extending around the leg.

26. An assembly as recited in claim 23 wherein the tensioning means comprises a torsional spring affixed to the connector block and rod.

27. An assembly as recited in claim 22 further comprising a fold down arm assembly pivotally attached to the wheelchair frame through two pivot pins, each extending through a pivotal linkage joining the arm assembly and wheelchair frame adjacent a seat of the wheelchair and releasable locking means for selectively locking and releasing the arm assembly in an upright position.

28. An assembly as recited in claim 27 wherein the releasable locking means comprises at least one of the pivot pins having a first portion with a noncircular cross section and a second portion with a generally circular cross section and pivot pin positioning means for selectively extending at least a portion of the first portion of the pivot pin through the pivotal linkage joining the arm assembly and wheelchair frame.

29. An assembly as recited in claim 28 wherein the pivot pin positioning means comprises a biasing spring attached to the pivot pin for urging the first portion of the pivot pin into the pivotal linkage and an eccentric clip pivotally attached to the pivot pin for overcoming the biasing spring and positioning the second portion of the pivot pin in the pivotal linkage.

30. An assembly as recited in claim 22 further comprising a flip up arm assembly pivotally attached to the wheelchair frame through a pivot pin extending through the arm assembly and wheelchair frame adjacent the back of the wheelchair.

31. An assembly as recited in claim 30 wherein the arm assembly includes a base portion which interconnects with the wheelchair frame adjacent the seat.

32. An assembly as recited in claims 1, 12, or 16 further comprising a recess in the connector block for receiving a projecting pin extending from the first arm and which cooperate to lock the leg in a surface-engaging position.

* * * * *

UNITED STATES PATENT AND TRADEMARK OFFICE
CERTIFICATE OF CORRECTION

PATENT NO. : 4,422,660

DATED : December 27, 1983

INVENTOR(S) : William D. Costello, Charles J. Helton, III, Martin B. Frank

It is certified that error appears in the above-identified patent and that said Letters Patent are hereby corrected as shown below:

Column 3, line 58, after "enabling" insert -- lateral --.

Column 4, line 54, change "can" to -- will --.

Column 5, line 40, after "orifice" insert -- extending --.

Column 9, line 18, change "for" to -- For --.

Column 9, line 20, after "pivot" insert -- pin --.

Column 9, line 64, after "pivot" insert -- pin --.

Column 10, line 63, change "levels" to -- levers --.

Column 12, line 32, change "slots" to -- slot --.

Column 14, line 17, change "liked" to -- linked --.

Signed and Sealed this

*Twenty-eighth* Day of *February 1984*

[SEAL]

*Attest:*

GERALD J. MOSSINGHOFF

*Attesting Officer* *Commissioner of Patents and Trademarks*